United States Patent
Hsu (10) Patent No.: US 9,429,922 B2
(45) Date of Patent: Aug. 30, 2016

(54) METHOD OF PROCESS STABILITY (71) Applicant: Taiwan Semiconductor Manufacturing Co., Ltd., Hsin-Chu (TW)

(72) Inventor: Chih-Wei Hsu, Chuang-Hua (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 502 days.

(21) Appl. No.: 13/748,681

(22) Filed: Jan. 24, 2013

(65) Prior Publication Data

US 2014/0207269 A1    Jul. 24, 2014

(51) Int. Cl.
*G05B 19/418* (2006.01)
*G05B 13/04* (2006.01)
*G05B 17/02* (2006.01)

(52) U.S. Cl.
CPC ............. *G05B 13/042* (2013.01); *G05B 17/02* (2013.01); *Y02P 90/26* (2015.11)

(58) Field of Classification Search
CPC ...... G05B 17/02; G05B 13/042; Y02P 90/26
USPC ............................................. 700/117
See application file for complete search history.

(56) References Cited

U.S. PATENT DOCUMENTS

| | | | | |
|---|---|---|---|---|
| 5,517,097 A * | 5/1996 | Hayashida | | 318/568.22 |
| 5,928,962 A * | 7/1999 | Farkas | | B24B 37/04 257/E21.23 |
| 7,337,019 B2 * | 2/2008 | Reiss et al. | | 700/21 |
| 2002/0107599 A1 * | 8/2002 | Patel et al. | | 700/99 |
| 2008/0091290 A1 * | 4/2008 | Kubota | | H01L 21/67745 700/110 |
| 2008/0233662 A1 * | 9/2008 | Shen | | G05B 15/02 438/8 |
| 2012/0191236 A1 * | 7/2012 | Ausschnitt | | 700/105 |
| 2013/0306621 A1 * | 11/2013 | Chang | | H01L 21/67115 219/497 |

* cited by examiner

Primary Examiner — Kenneth M Lo
Assistant Examiner — Alan Chu
(74) Attorney, Agent, or Firm — Eschweiler & Associates, LLC (57) ABSTRACT

The present disclosure relates to an APC method and tool architecture to elaborate process stability, comprising a two-loop architecture for fine tuning by an APC loop and recovery tuning by an equipment performance optimization (EPO) loop of one or more process parameters. Fine tuning by the APC loop comprises neutralization of systematic drifts from manufacturing tool or the manufacturing process itself. Recovery tuning by the EPO loop comprises aligning processing tool conditions with their tool baseline configuration. The APC method and tool architecture establishes switching criteria for fine tuning of process parameters and recovery tuning of equipment parameters. A synergy mechanism is further established between the two loops, wherein adjustments to equipment parameters made by the EPO loop are recognized by the APC loop to avoid double-tuning. The APC method and tool architecture results in manufacturing process stability within a manufacturing process module.

12 Claims, 8 Drawing Sheets

METHOD OF PROCESS STABILITY

BACKGROUND

Advanced process control (APC) in product manufacturing utilizes multivariable algorithms to tune a set of interdependent process parameters controlling a fabrication tool which determines a manufacturing outcome. These algorithms are iteratively solved by APC architectures comprising process control tools and process modeling tools, which target predicted outcomes relative to a process baseline value. These solutions are communicated to the fabrication tool for process tuning. Current APC infrastructure and architectures within semiconductor manufacturing limit the range of process tuning to a fraction of the complete tool tuning range. Outside of this range one or more equipment parameters may have drifted from a tool baseline value. Manual tuning of equipment parameters is performed to restore the tool baseline value.

DETAILED DESCRIPTION

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

Figure 1A:
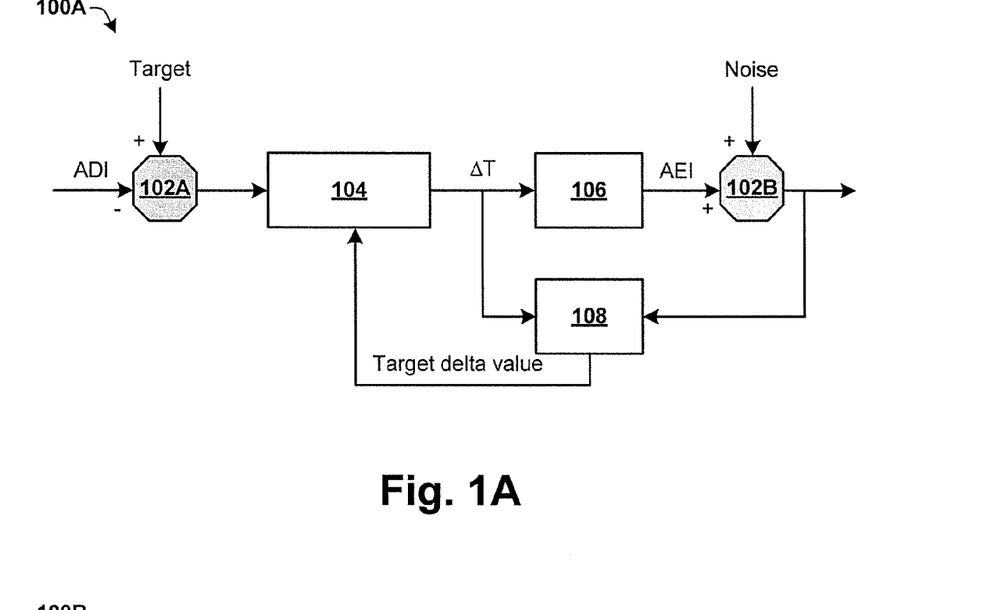
FIGS. 1A-1B illustrate an APC architecture and exemplary tuning ranges.

FIG. 1A illustrates an advanced process control (APC) architecture 100A, comprising a poly-silicon etch control procedure which is performed as a step, or process module, within a semiconductor manufacturing process. The APC architecture 100A further comprises a controller 104 coupled to a process modeling tool 106 and a filter 108. The process modeling tool 106 is configured to solve a multivariable control problem comprising a relationship between process parameters to predict in the future how the process parameters will behave after an etch step of a semiconductor fabrication process. In this exemplary etch process, the process modeling tool 106 receives an etch time adjust value ($\Delta T$) from the controller 104, and predicts a trench critical dimension (CD) for a trench formed under a predetermined set of manipulated parameters (e.g., etchant type, etch rate, etch time including $\Delta T$, etc.) which control the exemplary etch process. The process modeling tool 106 utilizes design of experiment data, process data measured from previous iterations of the semiconductor manufacturing process, etc., in conjunction with statistical methods to construct a process model which may vary in complexity from a linear equation to more complex descriptions.

The controller 104 is configured to determine the etch time adjust value ($\Delta T$) from an after development inspection (ADI) value, wherein the ADI value is measured for a semiconductor workpiece in an exemplary lithography process, and wherein the semiconductor workpiece is inspected for a first structural parameter value (e.g., photoresist thickness, etc.) after a develop step of the exemplary lithography process. The first structural parameter value is then subtracted from a target value in a first summation tool 102A, and the result is sent to the controller 104 is configured to determine the etch time adjust value ($\Delta T$), and redefines the etch time by adding or subtracting $\Delta T$.

The filter 108 is configured to receive an after etch inspection (AEI) value comprising information about physical properties of trench etched in a poly-silicon material of the semiconductor workpiece (i.e., trench CD), wherein the AEI value is predicted by the process modeling tool, and wherein noise from random residual effects in an ambient environment surrounding the semiconductor workpiece has been added to the AEI value in a second summation tool 102B to reflect a real-world result (i.e., accounting for random effects) of the semiconductor manufacturing process. The filter 108 is further configured to produce a target delta value from a comparison of the AEI value to a process target value derived from the $\Delta T$ received by the filter 108 from the controller 104. The target delta value is sent from the filter 108 to the controller 104 to refine the etch process.

Figure 1B:
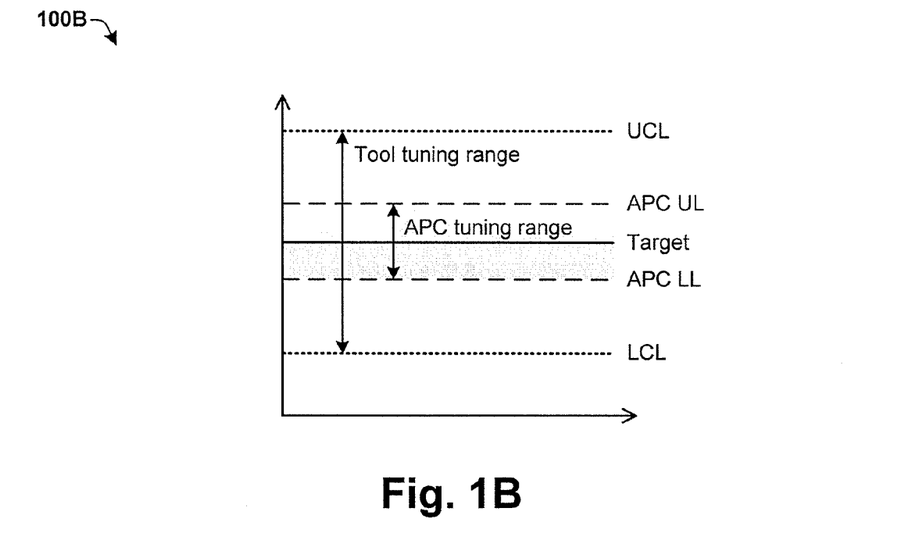

FIG. 1B illustrates exemplary APC tuning ranges 100B within an APC architecture, wherein a processing tool comprises a tool tuning range centered around a process target. The tool tuning range is defined as a first range between a lower control limit (LCL) and an upper control limit (UCL) of the processing tool. In an exemplary embodiment, the processing tool may comprise an illumination tool for optical lithography, wherein the first range comprises a depth of focus between the LCL and the UCL. Some prior art APC systems only allow for fine tuning within an APC tuning range comprising a fraction (e.g., approximately 30%) of the tool tuning range to minimize any degradation to manufacturing throughput resulting from the processing tuning relative to the process target. The APC tuning range is centered around the process target and spans a second range between an APC lower level (LL) and an APC upper level (UL) for the processing tool. When a manufacturing outcome deviates from the process target by an amount which exceeds an APC tuning range (e.g., greater than approximately 30%), processing tool conditions may have been biased from their tool baseline configuration, and manual tuning of tool equipment parameters other than those controlling the manufacturing outcome may be required. As a result, the processing tool may be taken offline for manual calibration, which can reduce manufacturing throughput while the tool is down.

Accordingly, the present disclosure relates to an APC method and tool architecture to elaborate process stability, comprising a two-loop architecture for fine tuning by an APC loop and recovery tuning by an equipment performance optimization (EPO) loop of one or more process parameters. Fine tuning by the APC loop comprises neutralization of systematic drifts from manufacturing tool or the manufacturing process itself. Recovery tuning by the EPO loop comprises aligning processing tool conditions with their tool baseline configuration. The APC method and tool architecture establishes switching criteria for fine tuning of process parameters and recovery tuning of equipment parameters. A synergy mechanism is further established between the two loops, wherein adjustments to equipment parameters made by the EPO loop are recognized by the APC loop to avoid double-tuning. The APC method and tool architecture results in manufacturing process stability within a manufacturing process module.

Figure 2A:
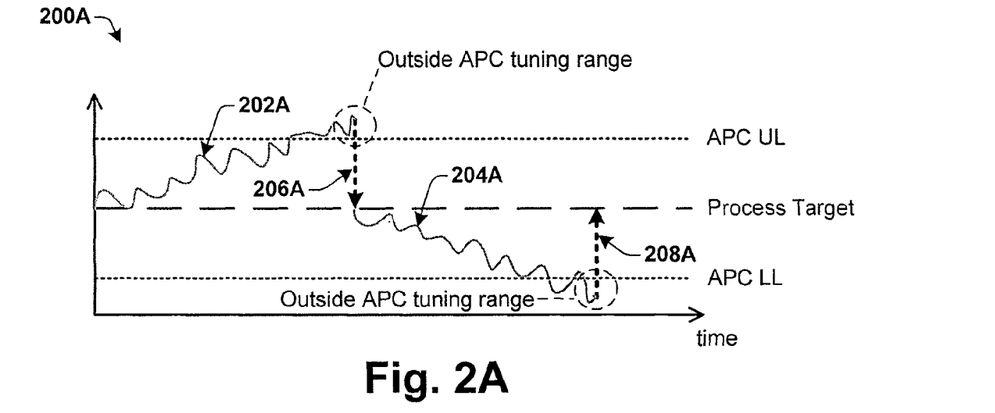
FIGS. 2A-2C illustrate some embodiments of parameter trend decoupling in an APC architecture.

FIG. 2A illustrates a parameter trend chart 200A derived by an APC architecture, comprising a first trendline 202A and a second trendline 204A, which plot a manipulated parameter (e.g., etch time, gas pressure, gas flow rate, temperature, etc.) as a function of time. For a manipulated parameter which deviates from the process target by an amount that is less than one half of an APC tuning range (i.e., a difference between the APC UL and the process target, or a difference between the process target and the APC LL), the APC architecture is configured to return the manipulated parameter to the process target by tuning one or more of the manipulated parameters that define a fabrication process, a process defined as fine tuning. As a result, the fabrication process driven by the APC architecture is allowed to drift within the APC tuning range, resulting in a range of performance of the fabrication process. For a manipulated parameter which deviates from the process target by an amount that is more than or equal to one half of an APC tuning range, the APC architecture is configured to hold or terminate the fabrication process for recovery tuning (206A and 208A), wherein the manipulated parameter is returned to the process target by manually tuning one or more equipment parameters of a fabrication tool driven by the APC.

Fine tuning within the APC tuning range produces a manufacturing outcome with a range of performance within a predetermined process specification limit. A manipulated parameter outside of the APC tuning range is not acceptable for a quality result of a given manufacturing process. As a result, a hold is placed on the manufacturing process and human intervention may be required. For a tool operating outside the APC tuning range the one or more equipment parameters are tuned manually to restore the tool baseline. However, it may be determined that the manipulated parameter outside of the tuning range results from a systematic shift of the one or more equipment parameters of the fabrication tool. In this event, an automated method to reverse the systematic shift may be employed without a need to hold or terminate the fabrication process for manual recovery tuning.

Figure 2B:
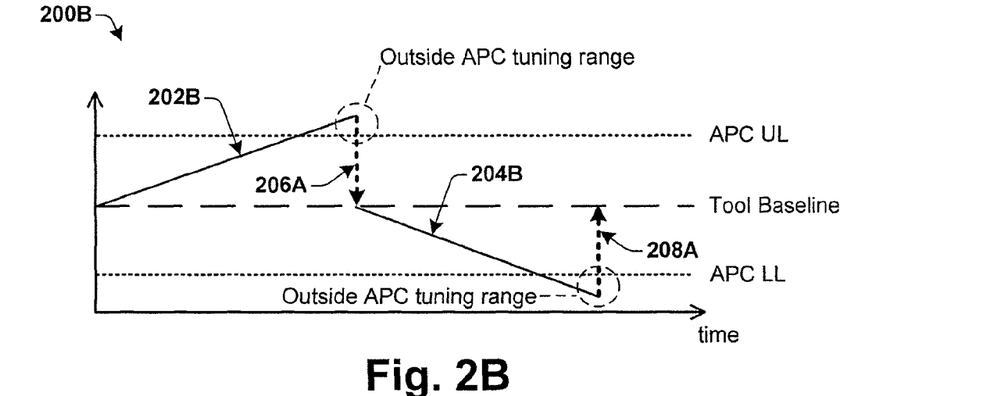
Figure 2C:
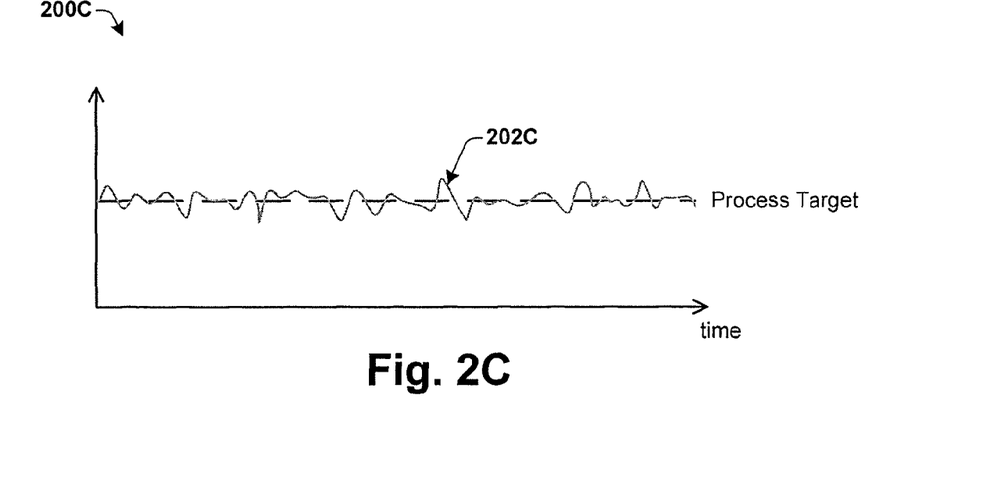

FIG. 2B illustrates some embodiments of trend decoupling 200B of a first systematic tool effect 202B from the first trendline 202A of FIG. 2A, and of a second systematic tool effect 204B from the second trendline 204A of FIG. 2A. The first systematic tool effect 202B and the second systematic tool effect 204B are substantially linear effects, recognized by the APC architecture as creating a manufacturing result that falls outside the process specification limit by a fabrication tool (e.g., etch tool, illumination tool, etc.), due to the manipulated parameter outside the APC tuning range, such that manipulated parameter is greater than a first predetermined threshold value (i.e., APC UL) or the manipulated parameter is less than a second predetermined threshold value (i.e., APC LL). When the first systematic tool effect 202B drives the manipulated parameter to a value greater than the APC UL, the APC architecture determines a first restoration value 206A to an equipment parameter (e.g., wet etchant concentration, optical focus, etc.) of the fabrication tool which restores the tool baseline value. When the second systematic tool effect 204B becomes less than APC LL, the kernel determines a second restoration value 208A to an equipment parameter of the fabrication tool which restores the tool baseline value. These restorations return the manipulated parameter dependent upon the equipment parameter to within the APC tuning range. FIG. 2C illustrates noise 202C due to remaining residual effects resulting from automated tuning within the APC tuning range and random effects within the fabrication tool, which have been decoupled from the first systematic tool effect 202B within the first trendline 202A of FIG. 2A, and decoupled from the second systematic tool effect 204B from the second trendline 204A of FIG. 2A.

For the embodiments of FIGS. 2A-2C the manipulated parameter is dependent upon the equipment parameter such that the first systematic tool effect 202B and the second systematic tool effect 204B drive the manipulated parameter outside the APC tuning range, creating a result of the manufacturing process that is outside the process specification limit. In general, equipment parameters that do not influence one or more manipulated parameters controlling a manufacturing outcome may be subject to a systematic tool effect. As a result, the one or more manipulated parameters controlling the manufacturing outcome remain inside the APC tuning range, while the manufacturing outcome falls outside the process specification limit. While restoring these equipment parameters to tool baseline values does not change the manipulated parameters, it does return the manufacturing outcome to within the process specification limit.

Figure 3:
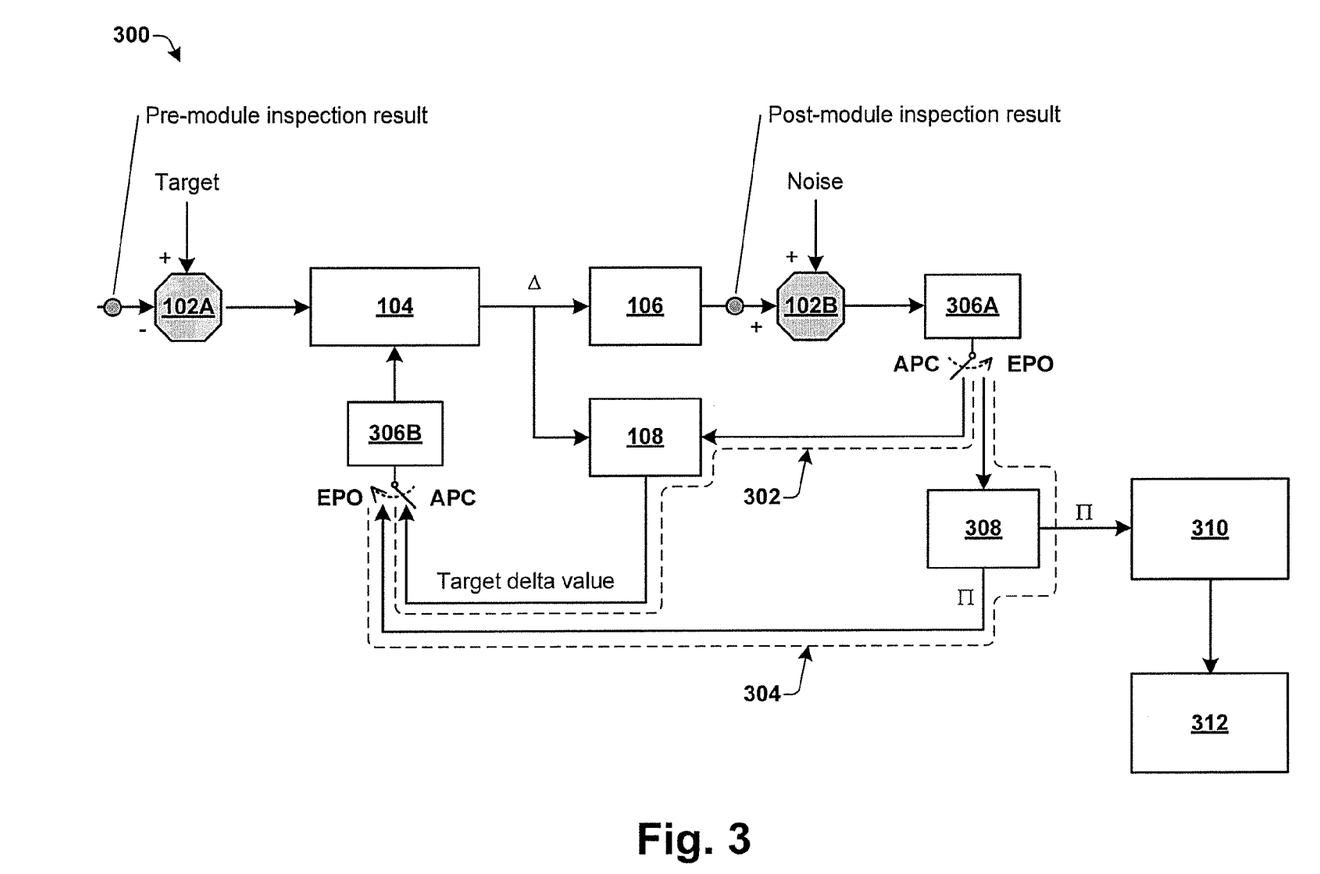
FIG. 3 illustrates some embodiments of a two-loop process control architecture comprising an APC loop and an equipment performance optimization (EPO) loop.

FIG. 3 illustrates some embodiments of a two-loop process control architecture 300 comprising an APC loop 302 and an EPO loop 304. The APC loop 302 is configured to iteratively adjust a manipulated parameter value (e.g., etch time, gas pressure, gas flow rate, temperature, etc.) of a manufacturing tool within an APC tuning range based upon a pre-module inspection value, a post-module inspection value, or a combination thereof. The pre-module inspection value is measured for a semiconductor workpiece, wherein the semiconductor workpiece is inspected for a first structural parameter value (e.g., photoresist thickness) after a pre-module fabrication step (e.g., a photoresist coating and develop step of a photolithography process which proceeds an etch step controlled by the two-loop process control architecture 300). The pre-module inspection value is sent to a first summation tool 102A, subtracted from a target value in the first summation tool 102A, and the result is sent to the controller 104 configured to determine the manipulated parameter adjust value ($\Delta$) from the first structural parameter value. The post-module inspection value is measured after completion of a module fabrication step (e.g., trench etch) or modeled by the process modeling tool 106 and sent to a second summation tool 102B.

The process modeling tool 106 is configured to model process deviation from a process baseline value of a fabrication result based upon the manipulated parameter adjusted to reflect the manipulated parameter adjust value ($\Delta$). The second summation tool 102B receives the post-module inspection value, and adds noise from random residual effects in an ambient environment surrounding the semiconductor workpiece to determine a variation of the post-module inspection value due to the residual effects. The filter 108 is configured to receive the post-module inspection result and produce a target delta value from a comparison of the post-module inspection result to a process target value derived from Δ. The controller 104 is configured to determine Δ from the pre-module inspection result and the target delta value received from the filter 108. Operation of the APC loop comprises an APC control loop mode.

The EPO loop 304 is configured to restore an equipment parameter value of a manufacturing tool (e.g., an etch tool) to a tool baseline value within a tool tuning range of the manufacturing tool if the pre-module inspection value or the post-module inspection value results from a manipulated parameter value that falls outside the APC tuning range of the APC loop 302. The EPO loop 304 further comprises a kernel 308 configured to determine a restoration value (Π) to the equipment parameter which restores the tool baseline value. The kernel 308 is further configured to send Π to a fabrication tool 312 (e.g., an illuminator, spin-coater, epitaxial growth chamber, etc.) to restore the equipment parameter to the tool baseline value. To achieve the restoration, the kernel 308 is coupled to a source 310 of the fabrication tool 312, wherein the source 310 is configured to supply the fabrication tool 312 with fabrication resource (e.g., reactive gases, power, photoresist, etc.) Operation of the EPO loop comprises an EPO control loop mode.

The EPO loop 304 further comprises a first switch 306A configured to divert the post-module inspection result from the kernel 308 to the filter 108 to disable the EPO loop 304 and enable the APC loop 302 when the post-module inspection result is less than a predetermined threshold value. The EPO loop 304 further comprises a second switch 306B configured to select between the target delta value and Π as the second input to the controller to disable the APC loop 302 and enable the EPO loop 304 when the post-module inspection result is greater than or equal to the predetermined threshold value. For synergy between the APC loop 302 and the EPO loop 304, the first switch 306A and the second switch 306B are configured to switch simultaneously between the APC loop 302 is and the EPO loop 304.

To iteratively adjust Δ for a manufacturing process based upon a pre-module inspection result subtracted from the target value in the first summation tool 102A, the controller 104 determines Δ, and sends Δ to the process modeling tool 106 and the filter 108. The process modeling tool 106 models whether a predicted manipulated parameter resulting from a next iteration of the fabrication process will exceed a predetermined threshold (i.e., the APC tuning range). If it does, the EPO loop 304 may be enabled if the predicted manipulated parameter value is within a process specification limit.

To iteratively adjust Δ of a manufacturing process based upon a post-module inspection result of the semiconductor workpiece, wherein noise from random residual effects has been added by the second summation tool 102B to the post-module inspection result and sent to the filter 108, which produces the target delta value from a comparison of the post-module inspection result to a process target value derived from Δ. The controller 104 receives the target delta value from the filter 108, and refines Δ for the next iteration of the fabrication process.

FIGS. 4-8 illustrate some embodiments of methods 400, 500, 600, 700, and 800 of process control for various exemplary embodiments and generalized embodiments.

While methods 400, 500, 600, 700, and 800 are illustrated and described as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
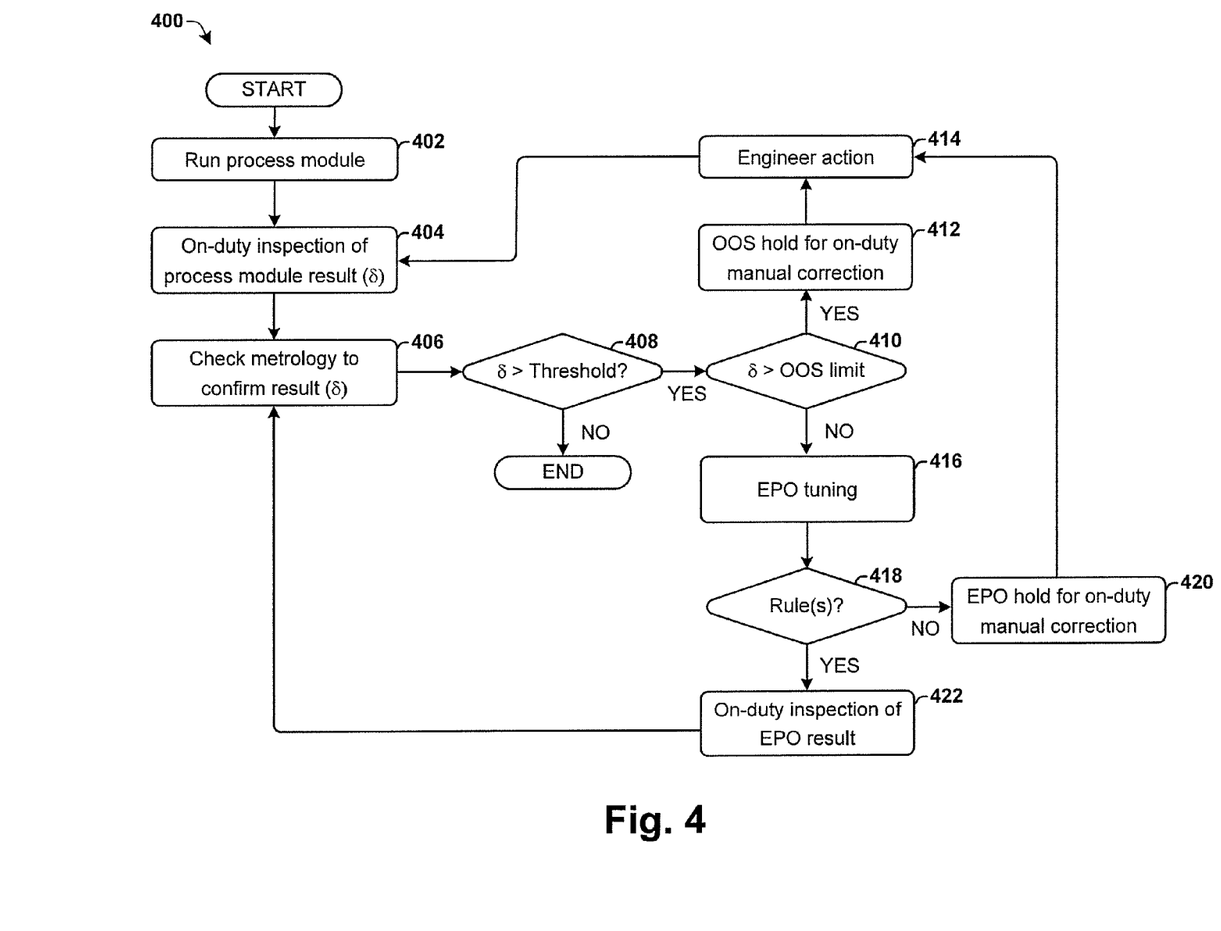
FIG. 4 illustrates an exemplary embodiment of a method of tuning synergy between an APC loop and an EPO loop for poly-silicon trench etch process control.

FIG. 4 illustrates an exemplary embodiment of a method 400 of tuning synergy between an APC loop and an EPO loop for poly-silicon etch process control within a semiconductor fabrication process.

At 402 a process module is performed comprising an etch process (e.g., wet etch or dry chemical etch, a plasma etch, etc) of a semiconductor workpiece to form a recess within the semiconductor workpiece which will be filled with a poly-silicon material in a subsequent fabrication step to form a gate within a semiconductor workpiece.

At 404 a post-module inspection result is acquired based upon a first manipulated parameter (δ) (e.g., etchant type, etch time, etc.), wherein the post-module inspection result comprises a CD of the recess formed by the etch process influenced by the first manipulated parameter (δ) resulting from the process module.

At 406 the post-module inspection result is incorporated into existing metrology data (e.g., inline data measures continuously throughout the fabrication process, offline data acquired daily, weekly, etc.).

At 408 a determination is made as to whether the first manipulated parameter (δ) deviates from a process baseline value by an amount that is greater than a predetermined threshold (i.e., APC UL or APC LL). If the first manipulated parameter (δ) deviates from the process baseline value by an amount that is less than the predetermined threshold, then an iteration of the APC loop 402 ends and the etch process is repeated for another iteration.

At 410, if the first manipulated parameter (δ) deviates from the process baseline value by an amount that is greater than a predetermined threshold, then a determination is made as to whether the deviation of the first manipulated parameter (δ) has a value that is less than a process specification limit of the first manipulated parameter (δ). In some embodiments, exceeding the process specification limit results in an etch time that results in a systemic "over-etch" of a trench CD, resulting in a gate poly recess which is wider and comprises more cross-section area than intended.

At 412 if the deviation of the first manipulated parameter (δ) exceeds the process specification limit, then the fabrication process is placed on hold for exceeding an out of specification (OOS) limit, wherein the OOS limit comprises a manufacturing limitation above which above which a manufacturing result cannot be guaranteed within quality limits.

At 414 an on-duty engineer manually calibrates an equipment parameter of the etch tool to return the equipment parameter controlling the manufacturing outcome to the tool baseline value, and new post-module inspection result is acquired to determine a second manipulated parameter value for a second iteration of the etch process resulting from the manual calibration. This determination avoids double-counting by the APC loop of the second manipulated parameter value.

At 416 if the deviation of the first manipulated parameter (δ) is less than the process specification limit, EPO tuning is performed to restore the etch tool to the tool baseline value within the EPO tuning loop. In some embodiments, EPO tuning comprises altering the chemical etchant composition or the etch time to eliminate the over etch and produce a desired trench CD.

At 418 a set of phenomenological rules are checked against a manufacturing outcome resulting from the EPO tuning. In some embodiments the rules comprise: determining a number of successive EPO tuning events, evaluating the (new) trench CD resulting from the third manipulated parameter to determine an amount of deviation from the process baseline.

At 420 if the manufacturing outcome fails to meet the requirements of the set of phenomenological rules, then the etch process is placed on hold for failing to meet EPO requirements, and an on-duty engineer manually calibrates an equipment parameter of the etch tool to return the manipulated parameter to the baseline value, and new post-module inspection result is acquired to measure the second manipulated parameter resulting from the manual calibration.

At 422 if the manufacturing outcome meets the requirements of the set of phenomenological rules, then an on-duty engineer manually verifies the result, and new post-module inspection result is acquired to measure a result of the third manipulated parameter resulting from the EPO tuning.

Figure 5:
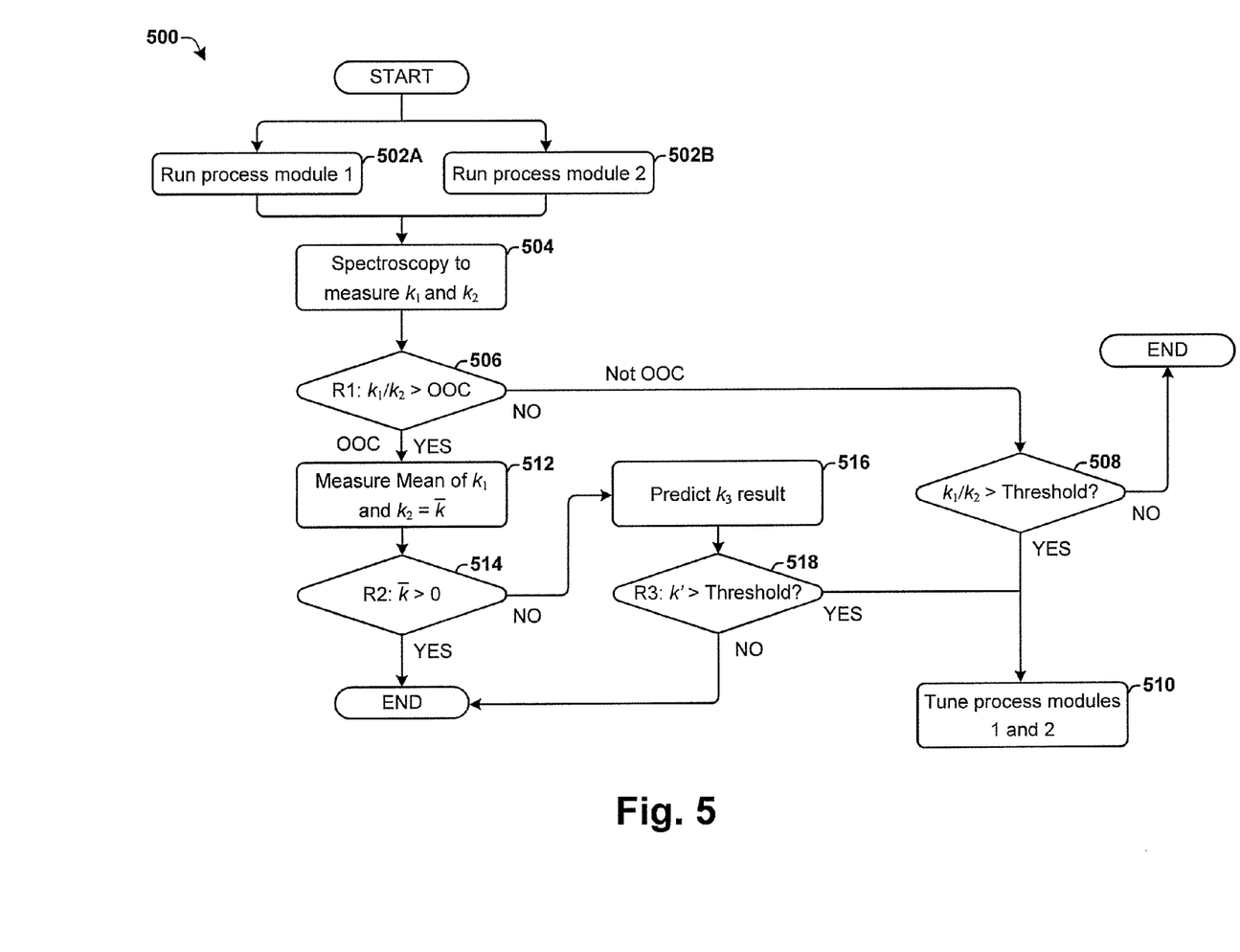
FIG. 5 illustrates an exemplary embodiment of a method of EPO tuning for chemical vapor deposition (CVD) process control, further comprising a first step of a two-step sequential tuning process.

FIG. 5 illustrates an exemplary embodiment of a method 500 of EPO tuning for CVD process control within a manufacturing system. The method 500 utilizes a comparison between two parallel fabrication steps to determine if deviation of a dielectric layer thickness from a target value, and further comprises a first step of a two-step sequential tuning process.

At 502A a first process module comprising CVD of a dielectric layer on a first semiconductor workpiece is performed. In some embodiments, the dielectric layer comprises hafnium silicate ($HfSiO_4$), zirconium silicate ($ZrSiO_4$), hafnium dioxide ($HfO_2$), or zirconium dioxide ($ZrO_2$) for enhanced device performance in a 28 nm technology node or below.

At 502B a second process module comprising CVD of a dielectric layer on a second semiconductor workpiece is performed.

At 504 a first band characteristic shift ($k_1$) of the first semiconductor workpiece and a second band characteristic shift ($k_2$) of the second semiconductor workpiece are monitored by a spectral technique (e.g., photoelectron spectroscopy, etc.).

At 506 a first rule is checked to determine if first band characteristic shift or the second band characteristic shift results from a manipulated parameter value which exceeds an out of control (0° C.) threshold of the CVD tool, wherein the 0° C. threshold comprises a tool limitation above which above which a quality of manufacturing result cannot be guaranteed (i.e., the ULC or LCL of the CVD tool).

At 508 if the first band characteristic shift and the second band characteristic shift pass the first rule then EPO tuning is not required. A determination is then made as to whether the first band characteristic shift or the second band characteristic shift results from a manipulated parameter value which deviates from a tool baseline by an amount that is greater than a predetermined threshold. If the manipulated parameter deviates from the nominal value by an amount that is less than the predetermined threshold, then the manufacturing system returns to APC tuning.

At 510 if the manipulated parameter deviates from the nominal value by an amount that is greater than or equal to the predetermined threshold, then the first process module or the second process module is placed on hold for failing to meet EPO requirements, and an on-duty engineer manually calibrates an equipment parameter of the first process module or the second process module to restore the nominal value.

At 512 if the first band characteristic shift or the second band characteristic shift fail the first rule, then EPO tuning is required. A mean value ($\bar{k}$ or k_bar) of the first band characteristic shift ($k_1$) or the second band characteristic shift ($k_2$) is determined.

At 514 a second rule is checked to determine if k_bar is greater than zero (i.e., is the average larger than the nominal value). If k_bar is greater than zero, then the average band characteristic shift is also greater than zero, and the manufacturing system returns to APC tuning.

At 516 if k_bar is less than zero, then EPO tuning adjusts one of more equipment parameters of the first process module or the second process module, and uses a formula (i.e., a model constructed from in-line metrology data, off-line monitoring data, design of experiment parameters, or a combination thereof, etc.) to predict a predicted band characteristic shift (k') resulting from the EPO tuning.

At 518 a third rule is checked to determine if the predicted band characteristic shift (k') deviates from the nominal value by an amount that is greater than the predetermined threshold, then the first process module or the second process module is placed on hold for failing to meet EPO requirements, and an on-duty engineer manually calibrates an equipment parameter of the first process module or the second process module to restore the nominal value (510). If the predicted band characteristic shift (k') deviates from the nominal value by an amount that is less than the predetermined threshold the, then the manufacturing system returns to APC tuning.

Figure 6:
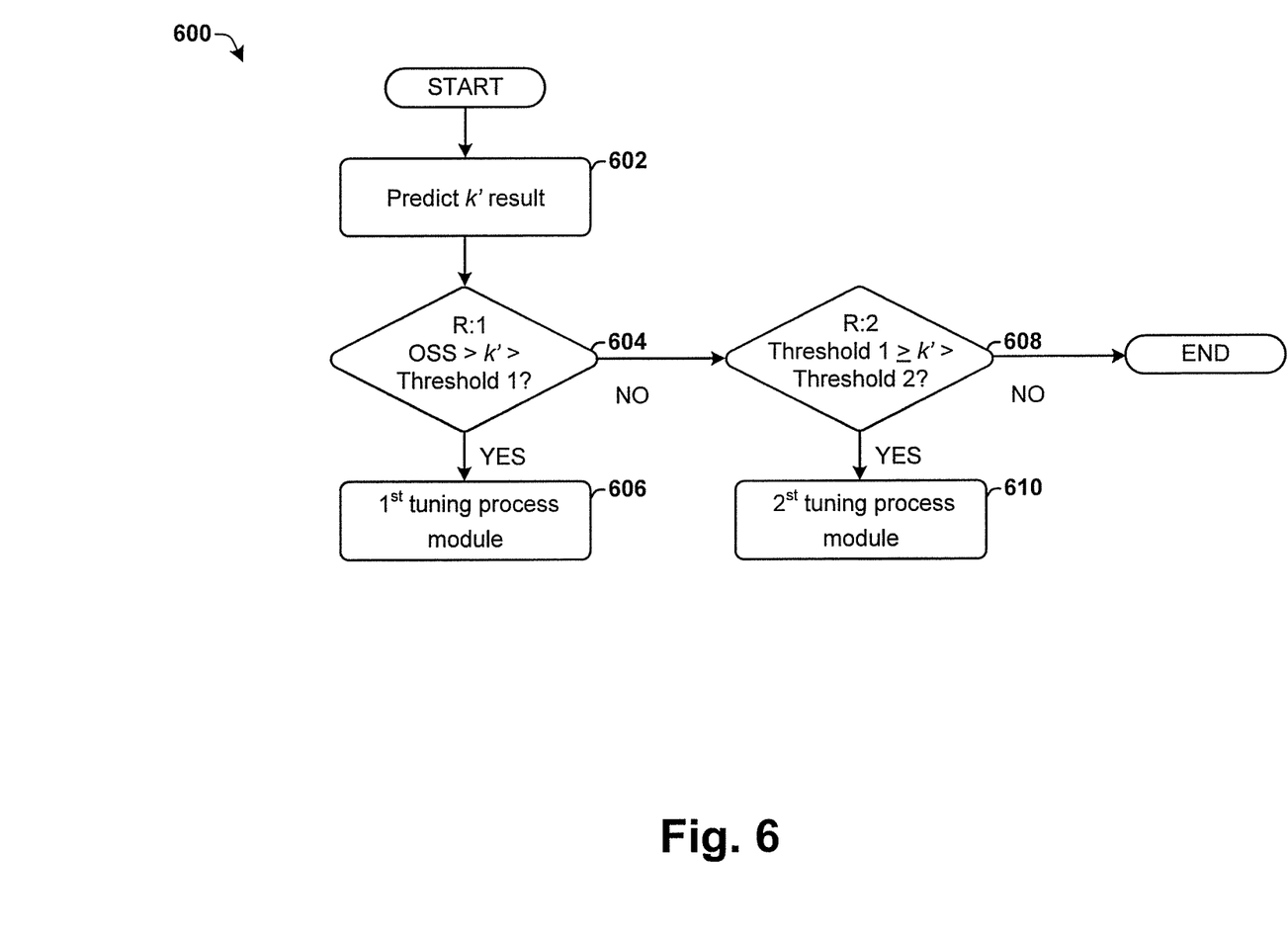
FIG. 6 illustrates an exemplary embodiment of a method of EPO tuning for chemical vapor deposition (CVD) process control, further comprising a second step of a two-step sequential tuning process.

FIG. 6 illustrates an exemplary embodiment of a method 600 of EPO tuning for CVD process control within the manufacturing system of the embodiments of FIG. 5, and further comprises a second step of the two-step sequential tuning process.

At 602 the predicted band characteristic shift (k') of an epitaxial layer grown by CVD from 516 of the embodiments of FIG. 5 is determined.

At 604 a first rule is checked to determine if the predicted band characteristic shift (k') is within a first range of a first lower bound comprising a first threshold and a first upper bound comprising an OOS limit of a manufacturing outcome controlled by the CVD tool.

At 606 if the predicted band characteristic shift (k') is within the first range, a first tuning event is performed to the epitaxial growth chamber. In some embodiments, the first tuning event comprises adjusting a material composition of the chemical vapor from which the epitaxial layer is grown.

At 608 if the predicted band characteristic shift (k') is not within the first range, a second rule is checked to determine if the predicted band characteristic shift (k') is within a second range of a second lower bound comprising a second threshold comprising an value which is less than the first threshold and a second upper bound comprising the first threshold. If the predicted band characteristic shift (k') is not within the second range, then no EPO tuning is required and the CVD tool is returned to APC tuning.

At 610 if the predicted band characteristic shift (k') is within the second range, a second tuning event is performed to the epitaxial growth chamber. In some embodiments, the second tuning event comprises adjusting a dose of the chemical vapor from which the epitaxial layer is grown.

Figure 7:
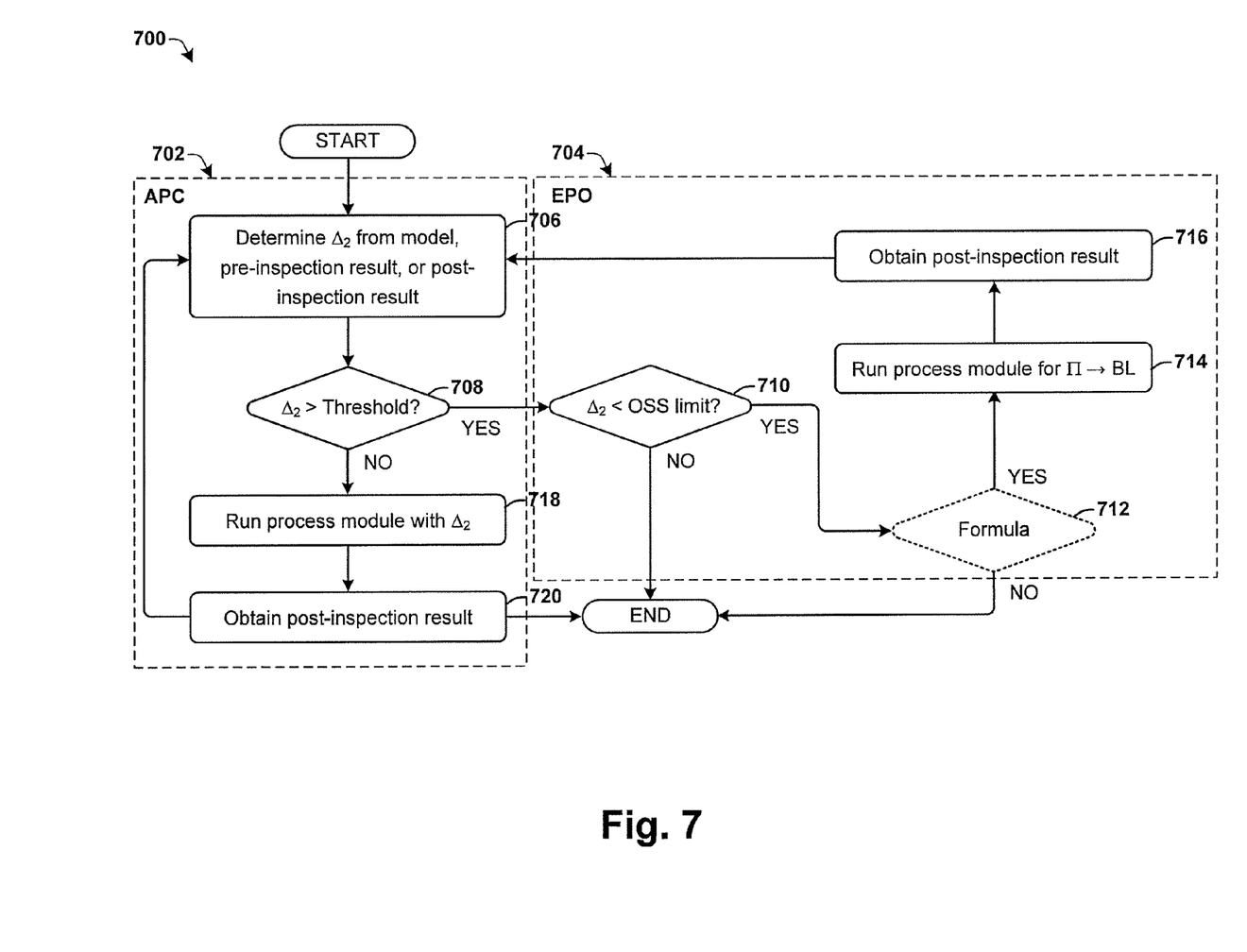
FIG. 7 illustrates some embodiments of a method of tuning synergy between an APC loop and an EPO loop.

FIG. 7 illustrates some embodiments of a method 700 of tuning synergy between an APC loop 702 and an EPO loop 704 within a fabrication tool.

At 706 a second manipulated parameter value ($\Delta_2$) of a manipulated parameter controlling a second iteration of a fabrication process is determined from a process model, a pre-module inspection value comprising a first deviation from a pre-module target, or a post-module inspection result comprising a second deviation from a post-module target, or a combination thereof. The process model comprises a mathematical model of the fabrication process constructed from model inputs comprising design of experiment data, manipulated parameter values from a plurality of iterations of the fabrication process, or a combination thereof. The process model is configured to calculate the second manipulated parameter value ($\Delta_2$) based upon the model inputs.

At 708 a determination is made as to whether the second manipulated parameter value ($\Delta_2$) is greater than a predetermined threshold value (e.g., an APC UL).

At 710 a determination is made as to whether the second manipulated parameter value ($\Delta_2$) is within a process specification limit if the second manipulated parameter value ($\Delta_2$) is greater than a predetermined threshold value. If the second manipulated parameter value ($\Delta_2$) is not within the process specification limit, then the process stops form manual intervention.

At 712 a formula is employed to restore the fabrication tool to a tool baseline value if the second manipulated parameter value ($\Delta_2$) is within the process specification limit. In some embodiments, the formula comprises modeling a first predicted manipulated parameter value resulting from restoring an equipment parameter value (Π) of the fabrication tool to the baseline value (BL), determining a third predicted manipulated parameter value resulting from restoring an equipment parameter of the fabrication tool to the tool baseline value and performing a third iteration of the fabrication process, or a combination thereof. In some embodiments, modeling the first predicted manipulated parameter value further comprises accumulating manipulated parameter data from a plurality of iterations of the fabrication process, and defining the rules governing process control from a measured range of variation of manipulated parameter data, a process specification limit, a tool tuning range, a process model, or a combination thereof. The rules governing process control dictate also criteria for termination of the method of process control (e.g., when a predicted fabrication result exceeds an OOC limit).

At 714 the third iteration of the fabrication process is performed with the equipment parameter value (Π) approximately equal to the tool baseline value (BL) if the first predicted manipulated parameter value or the third manipulated parameter value pass the one or more rules governing process control.

At 716 the post-module inspection value is determined upon completion of the third iteration of the fabrication process, and the post-module inspection value is fed back to the APC loop 702.

At 718 the second iteration of the fabrication process is performed with the manipulated parameter approximately equal to the second manipulated parameter value ($\Delta_2$) if the second manipulated parameter value ($\Delta_2$) is less than or equal to the predetermined threshold value.

At 720 the post-module inspection value is determined upon completion of the second iteration of the fabrication process. The fabrication tool returns to 706, and a third manipulated parameter value ($\Delta_3$, not shown) for the third iteration of the fabrication process is then determined from the process model, the pre-module inspection value, the post-module inspection value, or a combination thereof.

Figure 8:
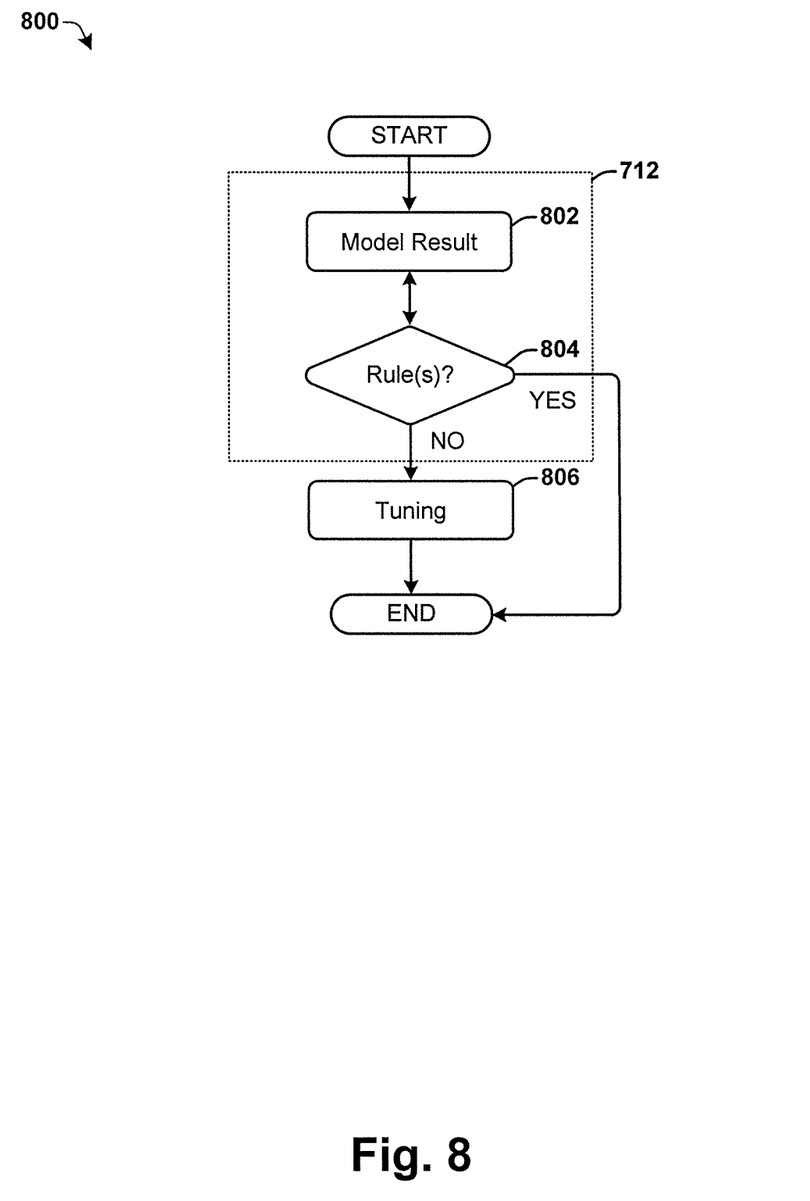
FIG. 8 illustrates some embodiments of a method of tuning within an EPO loop.

FIG. 8 illustrates some embodiments of a method 800 of tuning of a fabrication tool within an EPO loop.

At 802 a predicted manipulated parameter resulting from restoring the fabrication tool to a tool baseline value is modeled. The predicted manipulated parameter may comprise a trench dimension for a fabrication process comprising an etch, an epitaxial layer thickness for a fabrication process comprising epitaxial layer growth, etc.

At 804 the predicted manipulated parameter is verified against one or more rules governing process control. If the predicted manipulated parameter fails to meet the one or more rules, the EPO loop is terminated for manual intervention. In some embodiments, the one or more rules governing process control are derived by accumulating metrology data from a plurality of iterations of the fabrication process, and defining the rules from a measured range of variation of a respective module adjust value, process parameters, equipment parameters, or a combination thereof.

At 806 a tuning event is performed to the fabrication tool (e.g., adjusting chamber pressure, etch rate, material composition, etc.) if the manipulated parameter meets the one or more rules.

It will also be appreciated that equivalent alterations and/or modifications may occur to one of ordinary skill in the art based upon a reading and/or understanding of the specification and annexed drawings. The disclosure herein includes all such modifications and alterations and is generally not intended to be limited thereby. In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein; such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

Therefore, the present disclosure relates to an APC method and tool architecture to elaborate process stability, comprising a two-loop architecture for fine tuning by an APC loop and recovery tuning by an equipment performance optimization (EPO) loop of one or more process parameters. Fine tuning by the APC loop comprises neutralization of systematic drifts from manufacturing tool or the manufacturing process itself. Recovery tuning by the EPO loop comprises aligning processing tool conditions with their tool baseline configuration. The APC method and tool architecture establishes switching criteria for fine tuning of process parameters and recovery tuning of equipment parameters. A synergy mechanism is further established between the two loops, wherein adjustments to equipment parameters made by the EPO loop are recognized by the APC loop to avoid double-tuning. The APC method and tool architecture results in manufacturing process stability within a manufacturing process module.

In some embodiments the present disclosure relates to a process control architecture comprising an advanced process control (APC) loop configured to iteratively adjust a manipulated parameter value of a manufacturing tool within an APC tuning range based upon a pre-module inspection value, a post-module inspection value, or a combination thereof, and an equipment performance optimization (EPO) loop configured to restore an equipment parameter value to a tool baseline value within a tool tuning range of the manufacturing tool if the pre-module inspection value or the post-module inspection value results from a manipulated parameter value that falls outside the APC tuning range, wherein the APC tuning range comprises a subset of the tool tuning range. Synergy between the APC loop and EPO loop is achieved, wherein the process control architecture is configured to disable the EPO loop and enable the APC loop when a predicted manipulated parameter value determined by the process model, the pre-module inspection value, or post-module inspection value is within the APC tuning range, and further configured to disable the APC loop and enable the EPO loop when the predicted manipulated parameter value determined by the process model, the pre-module inspection value, or post-module inspection value is outside the APC tuning range.

In some embodiments the present disclosure relates to a process control architecture comprising an APC loop, further comprising a process control architecture comprising an advanced process control (APC) loop, further comprising a process modeler configured to model process deviation from a process baseline value of a manufacturing process result controlled by a manipulated parameter. A filter is configured to receive a post-module inspection value derived from the manipulated parameter comprising a manipulated parameter value, receive the manipulated parameter value, and produce a target delta value from a comparison of the post-module inspection value to a process target value derived from the manipulated parameter value. The further comprises a controller configured to determine the manipulated parameter value from a first input comprising a pre-module inspection value or a second input comprising the target delta value received from the filter, wherein a first switch is configured to divert the post-module inspection result from the filter to an equipment performance optimization (EPO) loop configured to restore an equipment parameter to a tool baseline value if the post-module inspection result falls outside an APC tuning range of the APC loop, and wherein the APC tuning range comprises a subset of the tool tuning range. The EPC loop further comprises a kernel configured to receive the post-module inspection value from the first switch and determine a restoration value to the equipment parameter which restores the tool baseline value. The kernel is configured to send the restoration value to one or more fabrication tools to restore the equipment parameter of the one or more fabrication tools to the tool baseline value. The EPC loop further comprises a second switch configured to select between the target delta value and the restoration value as the second input to the controller, wherein the first switch and the second switch are configured to switch simultaneously between the APC loop is and the EPO loop. The first switch is configured to send the post-module inspection value to the filter while the second switch is configured to simultaneously send the target delta value to the controller in an APC control loop mode. The first switch is further configured to send the post-module inspection result to the kernel while the second switch is simultaneously configured to send the restoration value to the controller in an EPO control loop mode.

In some embodiments the present disclosure relates to a method of process control, comprising determining a second manipulated parameter value of a manipulated parameter controlling a second iteration of a fabrication process from a process model, a pre-module inspection result comprising a first deviation from a pre-module target, or a post-module inspection result comprising a second deviation from a post-module target, or a combination thereof. The method of process control further comprises determining whether the second manipulated parameter value is within a process specification limit if the second manipulated parameter value is greater than a predetermined threshold value, and restoring an equipment parameter of a fabrication tool to a tool baseline value if the second manipulated parameter value is within the process specification limit.

What is claimed is:

1. A process control architecture, comprising:
   an advanced process control (APC) loop configured to iteratively adjust a manipulated parameter value of a manufacturing tool within an APC tuning range based upon a process model, a pre-module inspection value, and a post-module inspection value, wherein the manipulated parameter value corresponds to a process parameter of a manufacturing process performed by the manufacturing tool;
   an equipment performance optimization (EPO) loop configured to restore an equipment parameter value to a tool baseline value within a tool tuning range of the manufacturing tool if the pre-module inspection value or the post-module inspection value results from the manipulated parameter value falling outside the APC tuning range, wherein the EPO loop is configured to automatically restore the equipment parameter value to the tool baseline value without taking the manufacturing tool offline; and
   a first switch configured to divert the post-module inspection value from the APC loop to the EPO loop if the post-module inspection value falls outside the APC tuning range of the APC loop, wherein the EPO loop comprises a kernel configured to receive the post-module inspection value from the first switch and to automatically determine a restoration value to the equipment parameter which restores the tool baseline value, and wherein the kernel is independent of the process model.

2. The process control architecture of claim 1, configured to:
   disable the EPO loop and enable the APC loop when a predicted manipulated parameter value determined by the process model, the pre-module inspection value, or the post-module inspection value is within the APC tuning range; and
   disable the APC loop and enable the EPO loop when the predicted manipulated parameter value determined by the process model, the pre-module inspection value, or the post-module inspection value is outside the APC tuning range.

3. The process control architecture of claim 2, wherein the post-module inspection value is determined upon completion of the restoration of the equipment parameter value to the tool baseline value and fed back to the APC loop to iteratively adjust the manipulated parameter value.

4. The process control architecture of claim 3, the APC loop further comprising:
   a process modeler configured to model process deviation from a process baseline value of the manipulated parameter value;
   a filter configured to receive the post-module inspection value and the manipulated parameter value and produce a target delta value from a comparison of the post-module inspection value to a process target value derived from the manipulated parameter value; and a controller configured to determine the manipulated parameter value from a first input comprising a pre-module inspection result and a second input comprising the target delta value received from the filter.

5. The process control architecture of claim 4, wherein the kernel is configured to automatically identify a shift in the equipment parameter value from the post-module inspection value, and wherein the kernel is further configured to send the restoration value to one or more fabrication tools to restore the equipment parameter value to the tool baseline value.

6. The process control architecture of claim 5, the EPO loop further comprising:

the first switch configured to divert the post-module inspection value from the filter to the kernel; and a second switch configured to select between the target delta value and the restoration value as the second input to the controller;

wherein the first switch and the second switch are configured to switch simultaneously between the APC loop and the EPO loop.

7. A process control architecture comprising an advanced process control (APC) loop, the APC loop comprising:

a process modeler configured to model process deviation from a process baseline value of a manufacturing process result controlled by a manipulated parameter, and to derive a post-module inspection value based on a manipulated parameter value of the manipulated parameter;

a filter configured to:
receive the post-module inspection value derived from the manipulated parameter value;
receive the manipulated parameter value;
derive a process target value from the manipulated parameter value, the process target value being a desired outcome of a manufacturing process; and
produce a target delta value from a comparison of the post-module inspection value to the process target value; and a controller configured to determine the manipulated parameter value from a first input comprising a pre-module inspection value or a second input comprising the target delta value received from the filter;

wherein a first switch is configured to divert the post-module inspection value from the filter to an equipment performance optimization (EPO) loop configured to restore an equipment parameter to a tool baseline value if the post-module inspection value falls outside an APC tuning range of the APC loop, wherein the EPO loop comprises a kernel configured to receive the post-module inspection value from the first switch and to automatically determine a restoration value to the equipment parameter which restores the tool baseline value, wherein the kernel is independent of the process modeler.

8. The process control architecture of claim 7, wherein the kernel is configured to send the restoration value to one or more fabrication tools to restore the equipment parameter of the one or more fabrication tools to the tool baseline value.

9. The process control architecture of claim 7, wherein the EPO loop further comprises a second switch configured to select between the target delta value and the restoration value as the second input to the controller.

10. The process control architecture of claim 9, wherein the first switch and the second switch are configured to switch simultaneously between the APC loop and the EPO loop.

11. The process control architecture of claim 10, wherein the first switch is configured to send the post-module inspection value to the filter while the second switch is configured to simultaneously send the target delta value to the controller in an APC control loop mode, and wherein the first switch is configured to send the post-module inspection value to the kernel while the second switch is simultaneously configured to send the restoration value to the controller in an EPO control loop mode.

12. The process control architecture according to claim 7, wherein the EPO loop is configured to automatically restore the equipment parameter to the tool baseline value without taking a manufacturing tool controlled by the APC loop offline.

* * * * *